United States Patent
Taki et al.

(10) Patent No.: US 7,449,992 B2
(45) Date of Patent: Nov. 11, 2008

(54) ANTITHEFT APPARATUS

(75) Inventors: Naoki Taki, Okazaki (JP); Atsushi Watanabe, Anjo (JP); Takeo Endo, Nagoya (JP)

(73) Assignee: Toyota Jidosha Kabushiki Kaishi, Toyota-shi, Aichi-ken (JP)

( * ) Notice: Subject to any disclaimer, the term of this patent is extended or adjusted under 35 U.S.C. 154(b) by 68 days.

(21) Appl. No.: 11/441,242

(22) Filed: May 26, 2006

(65) Prior Publication Data
US 2007/0008085 A1    Jan. 11, 2007

(30) Foreign Application Priority Data
Jul. 7, 2005    (JP) .............................. 2005-199191

(51) Int. Cl.
  *B60R 25/10*    (2006.01)
  *B60L 1/00*    (2006.01)
(52) U.S. Cl. ............... 340/426.1; 340/429; 340/426.13; 340/426.17
(58) Field of Classification Search ............... 340/426.1
  See application file for complete search history.

(56) References Cited

U.S. PATENT DOCUMENTS

| | | | | |
|---|---|---|---|---|
| 3,732,555 A | * | 5/1973 | Strenglein | 340/426.17 |
| 4,754,255 A | * | 6/1988 | Sanders et al. | 307/10.4 |
| 5,479,148 A | * | 12/1995 | Umemoto | 340/426.36 |
| 5,543,776 A | * | 8/1996 | L'Esperance et al. | 340/426.25 |
| 7,030,739 B2 | * | 4/2006 | DiCroce | 340/426.1 |

FOREIGN PATENT DOCUMENTS

| | | |
|---|---|---|
| JP | 11-198648 | 7/1999 |
| JP | 2004-078365 | 3/2004 |
| JP | 2004-209999 | 7/2004 |

* cited by examiner

*Primary Examiner*—Donnie L Crosland
(74) *Attorney, Agent, or Firm*—Finnegan, Henderson, Farabow, Garrett & Dunner, LLP.

(57) ABSTRACT

The present invention discloses an antitheft apparatus mounted on a vehicle for protecting the vehicle from theft. The vehicle has a remote control device that controls a vehicle component of the vehicle in accordance with a control signal transmitted from a terminal. The antitheft apparatus includes an intruder detection part for detecting intrusion of an intruder, and an intrusion detection control part for controlling the detecting function of the intruder detection part during a period when the vehicle component is being controlled by the remote control device.

8 Claims, 8 Drawing Sheets

ANTITHEFT APPARATUS

BACKGROUND OF THE INVENTION

1. Field of the Invention

The present invention generally relates to an antitheft apparatus, and more particularly to an antitheft apparatus which is installed in a vehicle having a remote control device for controlling a vehicle component in accordance with a control signal transmitted from a terminal for protecting the vehicle from theft.

2. Description of the Related Art

A security apparatus is known, which detects intrusion of a parked vehicle and signals/notifies the driver of the intrusion. There are various ways for detecting an intrusion. For example, in a case of an intrusion detection sensor that detects vibration, an intruder is detected based on vibration created upon entry of the intruder or the breaking of glass (See, for example, Japanese Laid-Open Patent Application No. 2004-78365).

Meanwhile, in a case where a remote control device is installed in a vehicle, the driver of the vehicle can perform remote control of the components mounted on the vehicle by operating a terminal. For example, in a case where the driver performs remote control for opening/closing a door window, the vehicle opens/closes the designated door window in accordance with a received control signal.

However, in some cases, a vehicle component activated by such remote control may create vibration in the vehicle. Thereby, the detection sensor may accidentally set off an alarm upon detection of the vibration. That is, in a case where a vehicle having a security apparatus that is constantly armed (operational) when the vehicle is parked (for example, Japanese Laid-Open Patent Application No. 2004-78365), remote control may accidentally activate and set off the alarm of an intrusion sensor. On the other hand, carefully executed thefts cannot be detected if the sensitivity of the intrusion sensor is lowered in cases where the vehicle is parked.

SUMMARY OF THE INVENTION

It is a general object of the present invention to provide an antitheft apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an antitheft apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an antitheft apparatus mounted on a vehicle for protecting the vehicle from theft, the vehicle having a remote control device that controls a vehicle component of said vehicle in accordance with a control signal transmitted from a terminal, the antitheft apparatus including: an intruder detection part for detecting intrusion of an intruder; and an intrusion detection control part for controlling the detecting function of the intruder detection part during a period when the vehicle component is being controlled by the remote control device.

In the antitheft apparatus according to an embodiment of the present invention, the antitheft apparatus may further include: an alarm device for sounding an alarm when intrusion is detected by the intruder detection part; wherein the alarm device is deactivated by the intrusion detection control part during the period when the vehicle component is being controlled by the remote control device.

In the antitheft apparatus according to an embodiment of the present invention, the intrusion detection control part may be configured to deactivate the detection function of the intruder detection part.

In the antitheft apparatus according to an embodiment of the present invention, the intrusion detection control part may be configured to deactivate the alarm device before the intrusion detection control part deactivates the detection function of the intruder detection part, and may be configured to activate the deactivated alarm device after the intrusion detection control part deactivates the detection function of the intruder detection part.

In the antitheft apparatus according to an embodiment of the present invention, the intrusion detection control part may be configured to lower the detection sensitivity of the intruder detection part.

In the antitheft apparatus according to an embodiment of the present invention, the intrusion detection control part may be configured to extend the time period in which the intruder detection part detects intrusion.

In the antitheft apparatus according to an embodiment of the present invention, the intrusion detection control part may be configured to return the detection function of the intruder detection part back to a state existing before being controlled by the intrusion detection control part after the remote control device finishes controlling the vehicle component.

In the antitheft apparatus according to an embodiment of the present invention, the intrusion detection part may be configured to detect intrusion of an intruder by detecting vibration.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
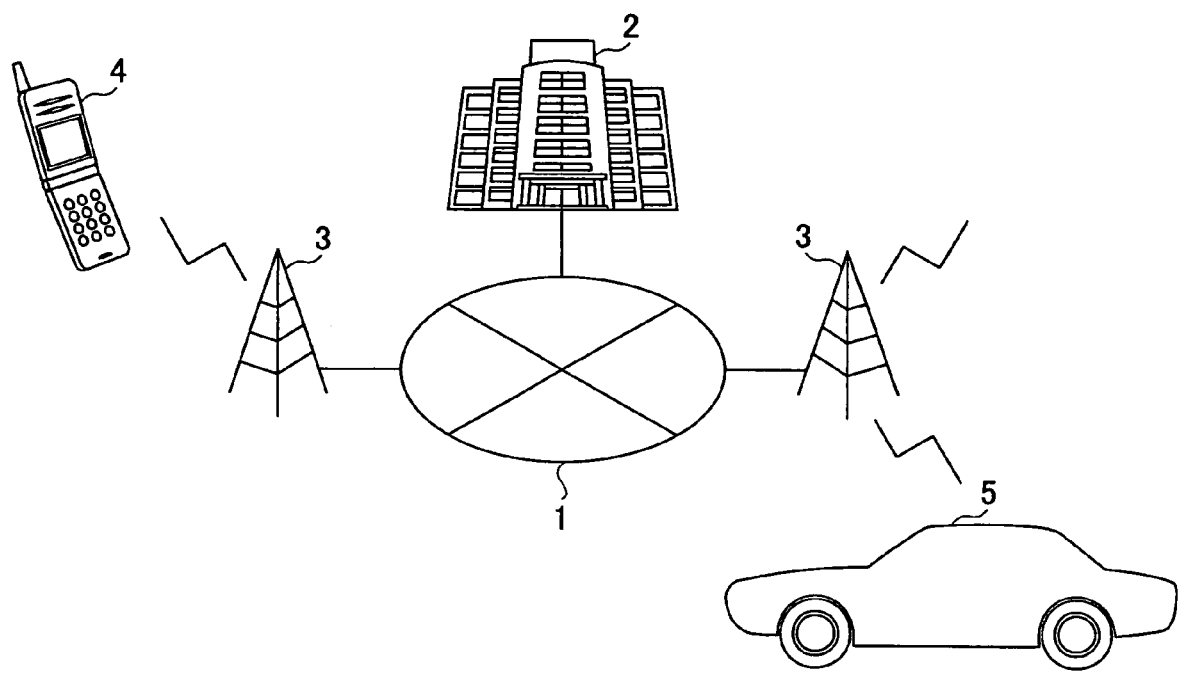
FIG. 1 is a schematic view showing an overall configuration of a remote control system for applying an antitheft apparatus according to an embodiment of the present invention.

FIG. 1 shows an overall configuration of a remote control system for applying an antitheft apparatus to a vehicle according to an embodiment of the present invention.

The remote control system includes, for example, a vehicle 5 which can be operated by remote control by the user, a service center 2 which chronologically (temporally) manages the operational state of vehicle components mounted on the vehicle 5, and a terminal (mobile device) 4 which is operated by the user. The service center 2 is connected to a network 1 (e.g. the Internet). The vehicle 5 and the terminal 4 are configured to perform wireless communications with a base station(s) 3 that is connected to the network 1. In the remote control system, a control signal that is input from the terminal 4 is transmitted to the vehicle 5 via the service center 2. The vehicle 5 controls its vehicle component(s) in accordance with the transmitted control signal. In this example, the user refers to one who is registered with the service center 2 and is able to control the vehicle 5 from the terminal 4. The user includes, for example, the driver of the vehicle 5.

The terminal 4 includes, for example, a mobile phone, a mobile notebook computer, a mobile hand-held computer (e.g. Personal Digital Assistant (PDA)), and a PHS (Personal Handyphone System). In other words, the terminal 4 may be any kind of device which can connect to the service center 2 via the network 1 and can perform various controls through the service center 2. It is to be noted that the terminal 4 may also transmit control signals directly to the vehicle 5, rather than transmitting the control signals via the service center 2.

The service center 2 intervenes between the vehicle 5 and the user (terminal 4) for providing various services to the user. For example, in a case where the vehicle 5 and the user are apart from each other at a predetermined distance, the user can control the vehicle components mounted on the vehicle 5 via the service center 2. Furthermore, in a case where an antitheft apparatus mounted in the vehicle 5 detects intrusion of the vehicle 5 or starting of the engine of the vehicle 5, the user can be notified of the detection via the service center 2.

The service center 2 includes a computer comprising, for example, a CPU, a ROM, a RAM, a memory apparatus, and a communication apparatus. The service center 2 is able to communicate with the terminal 4 and the vehicle 5 via the network 1.

Figure 2:
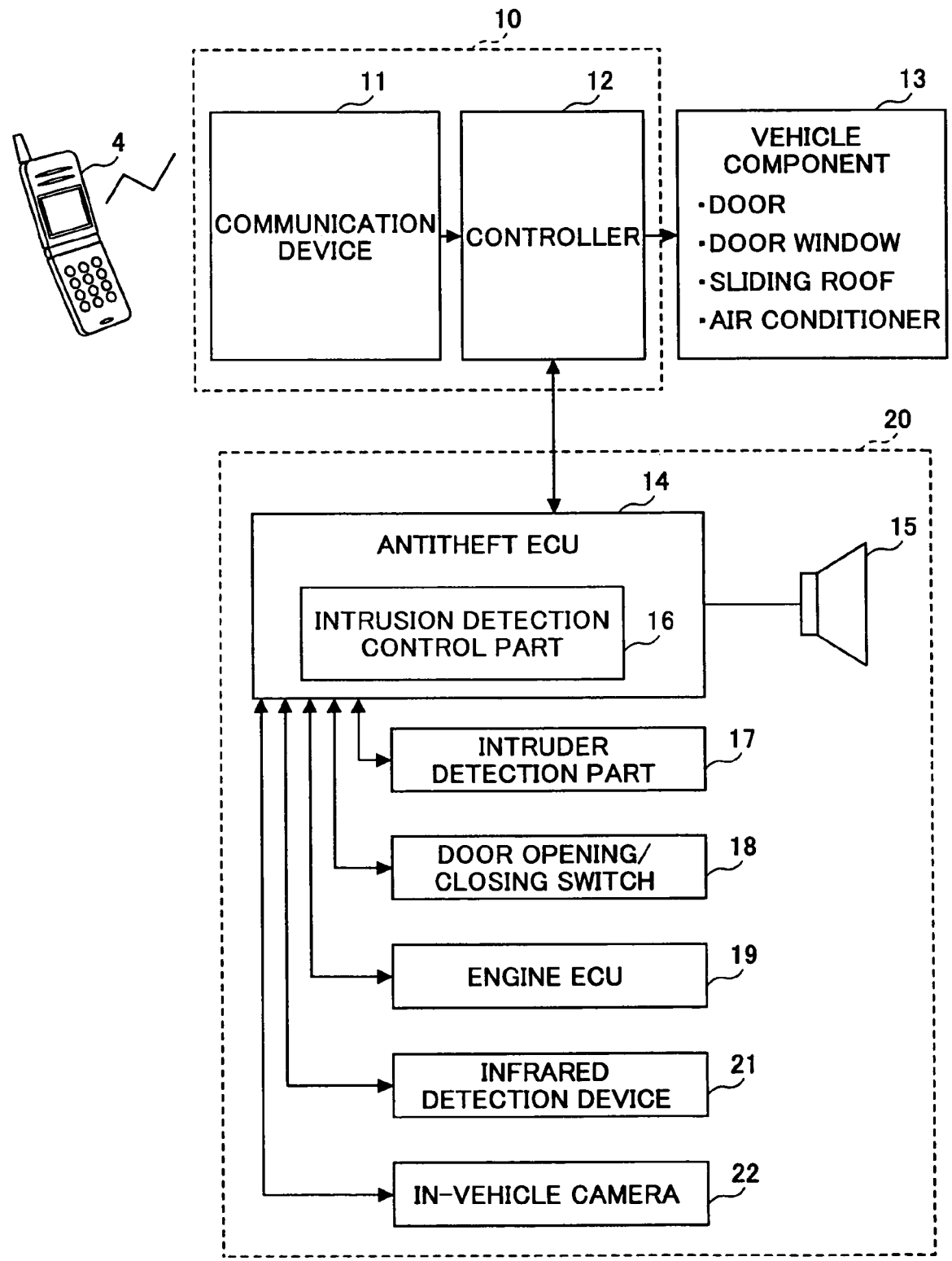
FIG. 2 is a block diagram showing various functions of a remote control device and an antitheft apparatus included in a vehicle according to an embodiment of the present invention.

Next, the vehicle 5 is described in further detail. FIG. 2 is a block diagram showing various functions of a remote control device 10 and an antitheft apparatus 20 included in the vehicle 5. The remote control device 10 includes a communication part (sending/receiving part) 11 and a controller 12. The controller 12 serves to control a vehicle component(s) 13 mounted on the vehicle 5.

The communication part 21 receives control signals transmitted from the service center 2 through a reception circuit and decodes the received control signals. The decoded control signals are sent to the controller 12. The controller 12 determines the content of the controls of the user (driver) and controls the vehicle component 13 in accordance with the determination result.

The vehicle component 13 includes, for example, a door, a door window, a sliding roof, or an air conditioner. For example, when the user operates the terminal 4 for opening or closing the door window, the controller 12 controls the opening or closing of the door window by driving an actuator configured to open or close the door window in accordance with the received control signal. It is to be noted that the control of the above-described components (door, door window, etc.) are merely examples. For example, the control may also include the on/off switching of the antitheft apparatus 20. In other words, the vehicle components and the controlling of the vehicle components may apply to any component, apparatus or device that is mounted on the vehicle 5.

The antitheft apparatus 20 includes, for example, an antitheft ECU 14, an intruder detection part 17, a door opening/closing switch 18, an engine ECU 19, an infrared detection device 21, an in-vehicle camera 22, and an alarm device 15. The intruder detection part 17 includes a sensor for detecting an intruder entering the vehicle 5. The intruder detection part 17 detects entry of the intruder based on shock applied to the vehicle 5 (e.g. vibration created by shaking of the vehicle 5 or breaking of a door window) and outputs a detection signal upon detecting entry of the intruder. Although there are various types of sensors for detecting vibration, one may be, for example, a sensor which determines whether there is an intruder in the vehicle in accordance with the value (amount) of a predetermined characteristic extracted from waveform signals created by the detected vibration. The value of the predetermined characteristic extracted from the waveform signals may be, for example, the peak value, the frequency (frequency vibration), or the length of time/number of times surpassing a threshold value.

The door opening/closing switch 18 is for detecting the opening and closing of the door. The door opening/closing switch 18 includes, for example, a courtesy switch which outputs detection signals when detecting opening or closing of the door. The infrared detection device 21 detects an intruder inside the vehicle 5 or an intruder attempting to enter the vehicle 5 by detecting infrared rays inside the vehicle 5 or in the vicinity of the vehicle 5 and outputs detection signals upon detecting the intruder. The in-vehicle camera 22 is set facing the inside of the vehicle 5 for taking images of the inside of the vehicle 5 and comparing the images taken from a prescribed angle at predetermined intervals of time. Based on the comparison, the in-vehicle camera 22 detects an intruder or something other than the still objects in the vehicle 5 and outputs detection signals upon the detection. The engine ECU 19 detects the operational state (e.g. water temperature) of the engine based on various sensor signals and performs various controls (e.g. fuel injection control, ignition timing control) according to the detection results. For the sake of convenience, the engine ECU 19 according to an embodiment of the present invention detects the starting of the engine and outputs detection signals upon detecting the starting of the engine.

After the ignition switch (not shown) is turned off and the door is closed and locked, the antitheft ECU 14 activates the security state of the antitheft apparatus 20. The security state of the antitheft apparatus 20 may also be activated at a given timing desired by the user. For example, the security state may be activated when a door lock command is transmitted from a key of a keyless entry system or when a switch device dedicated for the activation is turned on.

The antitheft ECU 14, which is connected to the intruder detection part 17, the door opening/closing switch 18, the engine ECU 19, the infrared detection device 21, and the in-vehicle camera 22, receives signals output from each of these connected parts and devices. In a case where the security state of the antitheft apparatus 20 is in an activated state, the alarm device 15 is sounded for signaling detection of an intruder when the intruder detection part 17 detects an intruder and outputs a detection signal. In this case, the antitheft apparatus 20 may also communicate the detection to the service center 2.

The antitheft ECU 14 includes an intrusion detection control part 16 for controlling the detection function of the intruder detection part 17. The intrusion detection control part 16 controls the detection function of the intruder detection part 17 during the time (period) when the vehicle component 13 is being controlled by the remote control device 10. For example, during the time (period) when the vehicle component 13 is being controlled by the remote control device 10, the intrusion detection control part 16 may switch off the intruder detection part 17, lower the sensitivity of the sensor of the intruder detection part 17, or extend the time for responding to detection of an intruder.

The antitheft ECU 14 and the controller 12 are connected so that the intrusion detection control part 16 can monitor the control signals from the controller 12 to the vehicle component 13 and detect the timing (period) in which the remote control device 10 controls the vehicle component 13.

First Embodiment

Figure 3:
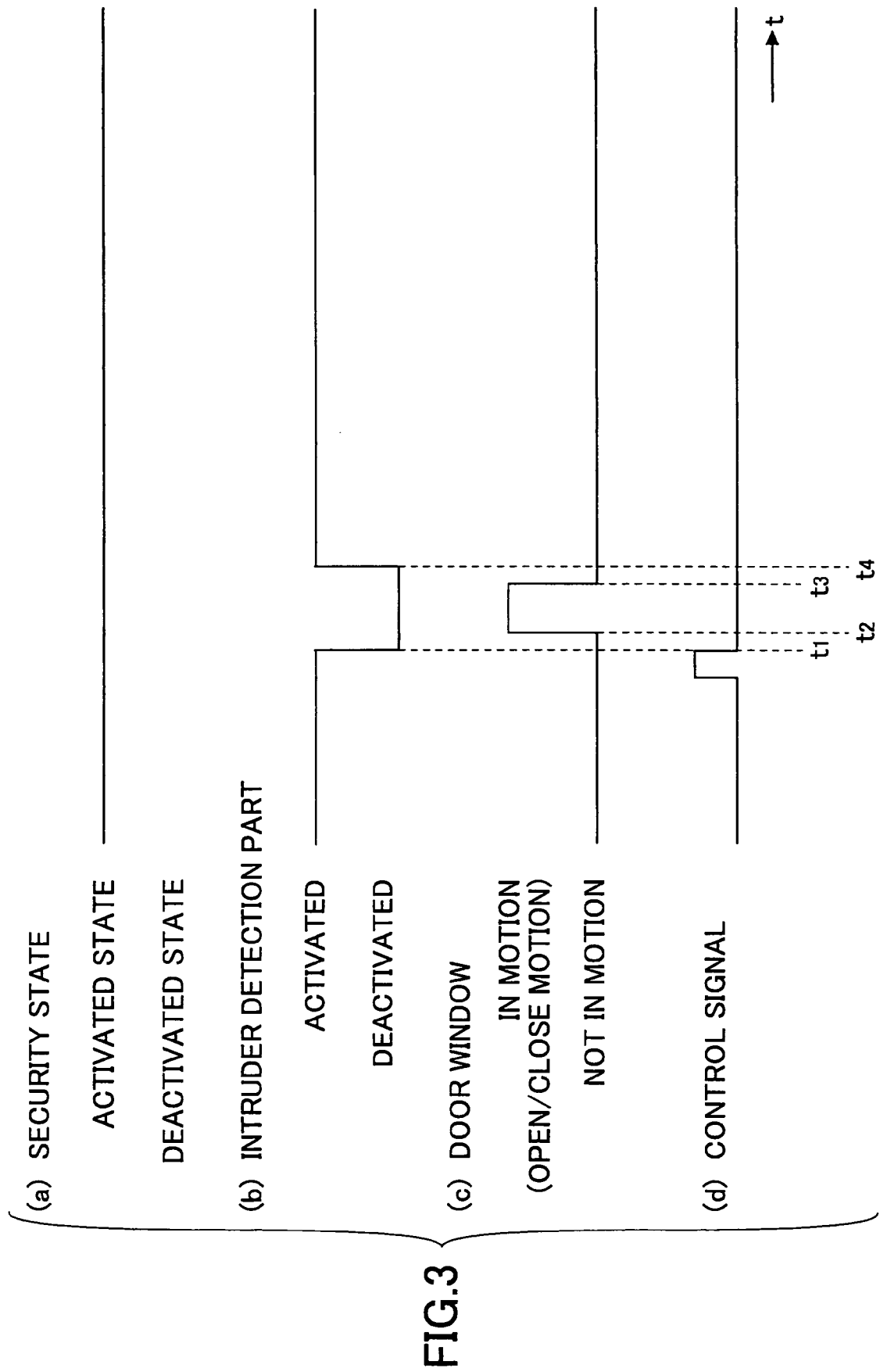
FIG. 3 is a timing chart for showing an operation of an antitheft apparatus according to the first embodiment of the present invention.

FIG. 3 is a timing chart showing the operation of the antitheft apparatus 20 according to the first embodiment of the present invention. As shown in (a) of FIG. 3, the security state of the antitheft apparatus 20 in the vehicle 5 is already in an activated state. Therefore, the alarm device 15 is ready to be sounded when an intruder enters the vehicle 5 or when the door is opened.

When the user uses (maneuvers) the terminal 4 to perform an open/close operation of the door window, the remote control device 10 receives a control signal for opening/closing the door window from the terminal 4 (timing t1). The controller 12 sends a reception signal indicating reception of the control signal of the door window to the antitheft ECU 14.

The intrusion detection control part 16 deactivates the intruder detection part 17 upon receiving the reception signal. Accordingly, the intruder detection part 17 does not detect intrusion (intruder) during the period between timing t1 and timing t4 (described below).

The antitheft ECU 14 sends a deactivation signal to the controller 12 when the intrusion detection control part 16 deactivates the intruder detection part 17. The controller 12 starts an opening/closing operation of the door window in accordance with the control signal when receiving the deactivation signal from antitheft ECU 14 (timing t2).

When the door window reaches an upper dead point or a lower dead point, the controller 12 detects the end of the opening/closing operation of the door window from a predetermined sensor (timing t3) and sends an end signal to the antitheft apparatus 20. The intrusion detection control part 16 activates the intruder detection part 17 when receiving the end signal from the controller 12 (timing t4).

Therefore, the intruder detection part 17 does not detect intrusion (intruder) during the period between timing t1 to timing t4. Accordingly, the intruder detection part 17 can be prevented from erroneously detecting the vibration created by the opening/closing (driving) of the door window or erroneously detecting the wind blowing in from an opened door window. Although the foregoing example describes a case where the door window is the target vehicle component 13, the foregoing example may be applied to a case of controlling other parts, apparatuses, and devices that are mounted on the vehicle 5 since the intruder detection part 17 is configured to detect intrusion based on shock applied to the vehicle 5. For example, in a case where a sliding roof is remote-controlled as the vehicle component 13, the antitheft apparatus 20 can be prevented from erroneously detecting vibration created from the sliding (driving) of the sliding roof by deactivating the intruder detection part 17.

Even when the intruder detection part 17 is deactivated, the door opening/closing switch 18, the engine ECU 19, the infrared detection device 21, and the in-vehicle camera 22 are operable to continue monitoring the vehicle 5 and transmit detection signals to the antitheft ECU 14 owing to the fact that the security state of the antitheft apparatus 20 is in an activated state during the period between timing t1 and timing t4. Therefore, even in such a state, the antitheft ECU 14 can sound the alarm of the alarm device 15 when a detection signal is output in response to, for example, the opening/closing of the door of the vehicle 5. Hence, erroneous sounding of the alarm can be prevented without lowering the level of security.

It is predetermined whether the intrusion detection control part 16 should control the detection function of the intruder detection part 17 in correspondence with the remote control for each vehicle component 13, in which the determination is based on whether the remote control of the target vehicle component 13 creates vibration in the vehicle 5. Accordingly, since the antitheft ECU 14 only has to mask the detection signal output from the intruder detection part 17 when the predetermined remote control is performed, the software for executing the control illustrated in FIG. 3 can have a simple configuration.

Although the timings t1-t4 are described as satisfying a relation of t1<t2<t3<t4 in the foregoing example, the timings t1 and t2 may satisfy a relation of t1=t2 and/or the timings t3 and t4 may satisfy a relation of t3=t4.

Second Embodiment

Figure 4:
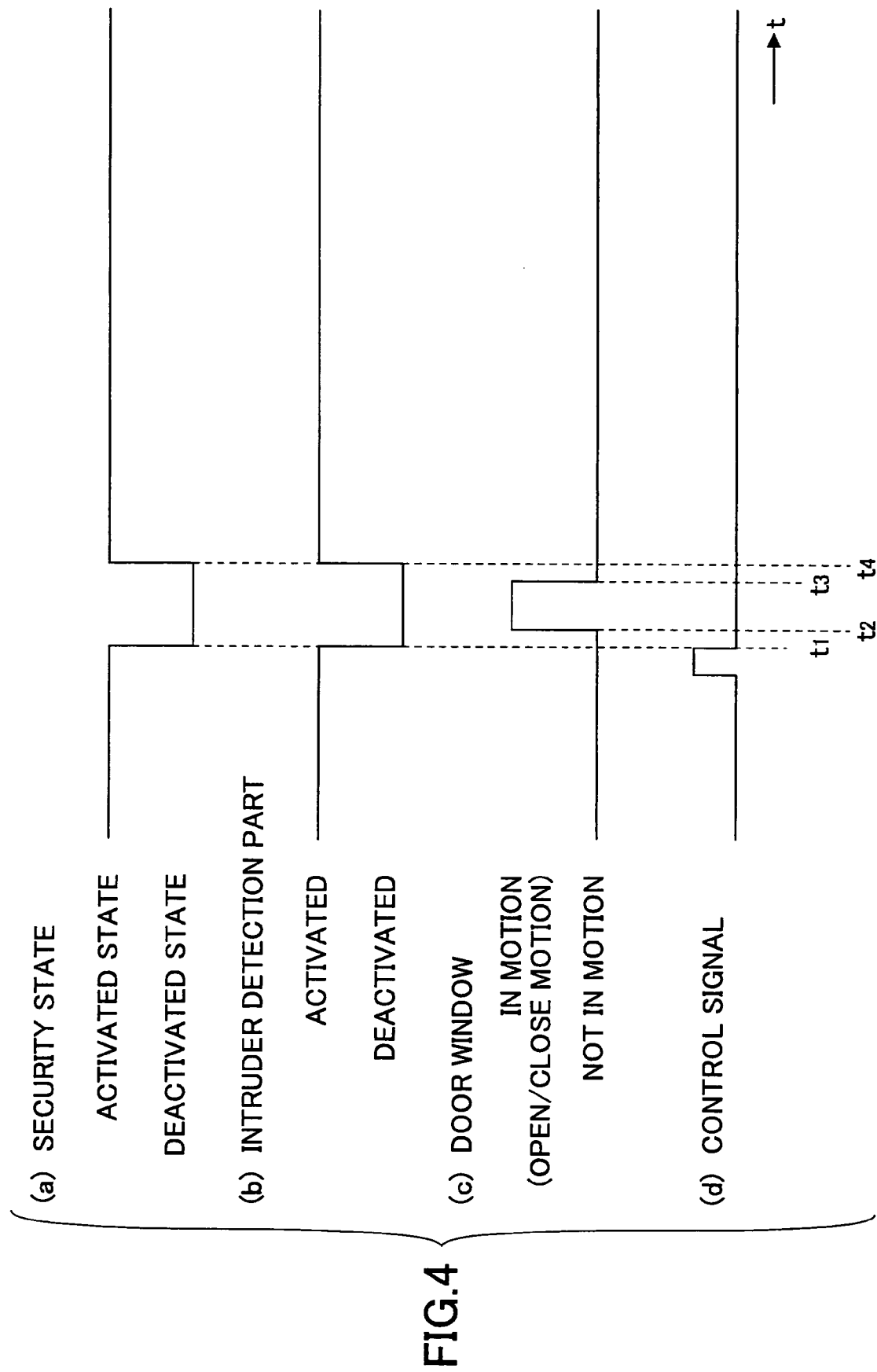
FIG. 4 is a timing chart for showing an operation of an antitheft apparatus according to the second embodiment of the present invention.

The antitheft apparatus 20 according to the second embodiment of the present invention prevents erroneous sounding of an alarm by deactivating the security state of the antitheft apparatus 20 during the period when a vehicle component 13 that creates vibration is being driven (in motion). FIG. 4 is a timing chart showing the operation of the antitheft apparatus 20 according to the second embodiment of the present invention. It is to be noted that like components are denoted with like reference numerals as of FIG. 3 and are not further described.

When the user uses (maneuvers) the terminal 4 to perform an open/close operation of the door window, the remote control device 10 receives a control signal for opening/closing the door window from the terminal 4 (timing t1). The controller 12 sends a reception signal indicating reception of the control signal of the door window to the antitheft ECU 14.

The antitheft ECU 14 sets the security state of the antitheft apparatus 20 to a deactivated state upon receiving the reception signal. When the antitheft ECU sets the security state to a deactivated state, the sensors (devices) dedicated for theft prevention (intrusion prevention) such as the intruder detection part 17 and the door opening/closing switch 18 are deactivated. Therefore, as shown in FIG. 4, the intruder detection part 17 is deactivated in synchronization with the deactivation of the security state (timing t1). Accordingly, the security state is in a deactivated state during the period between timing t1 and timing t4 (described below). Thus, the alarm device 15 does not sound its alarm even when a detection signal is output from one of the sensors during the period between timing t1 and timing t4.

The antitheft ECU 14 sends a deactivation signal to the controller 12 when the antitheft ECU deactivates the security state of the antitheft apparatus 20. The controller 12 starts an opening/closing operation of the door window in accordance with the control signal when receiving the deactivation signal from antitheft ECU 14 (timing t2).

When the door window reaches an upper dead point or a lower dead point, the controller 12 detects the end of the opening/closing operation of the door window from a predetermined sensor (timing t3) and sends an end signal to the antitheft apparatus 20. The antitheft ECU 14 sets the security state to an activated state when receiving the end signal from the controller 12 (timing t4). When the antitheft ECU 14 sets the security state to an activated state, the sensors (devices) dedicated for theft prevention (intrusion prevention) such as the intruder detection part 17 and the door opening/closing switch 18 are activated in synchronization with the activation of the security state.

Therefore, the antitheft ECU 14 does not sound the alarm device 15 during the period between timing t1 to timing t4. Accordingly, the intruder detection part 17 can be prevented from erroneously detecting the vibration created by, for example, the opening/closing (driving) of the door window or erroneously detecting the wind blowing in from an opened door window.

Accordingly, since the deactivation of the security state of the antitheft apparatus 20 causes the intruder detection part 17 to deactivate in synchronization with the deactivation of the security state, the software for executing the control illustrated in FIG. 4 can have a configuration which is even more simple than that of the first embodiment.

Third Embodiment

Figure 5:
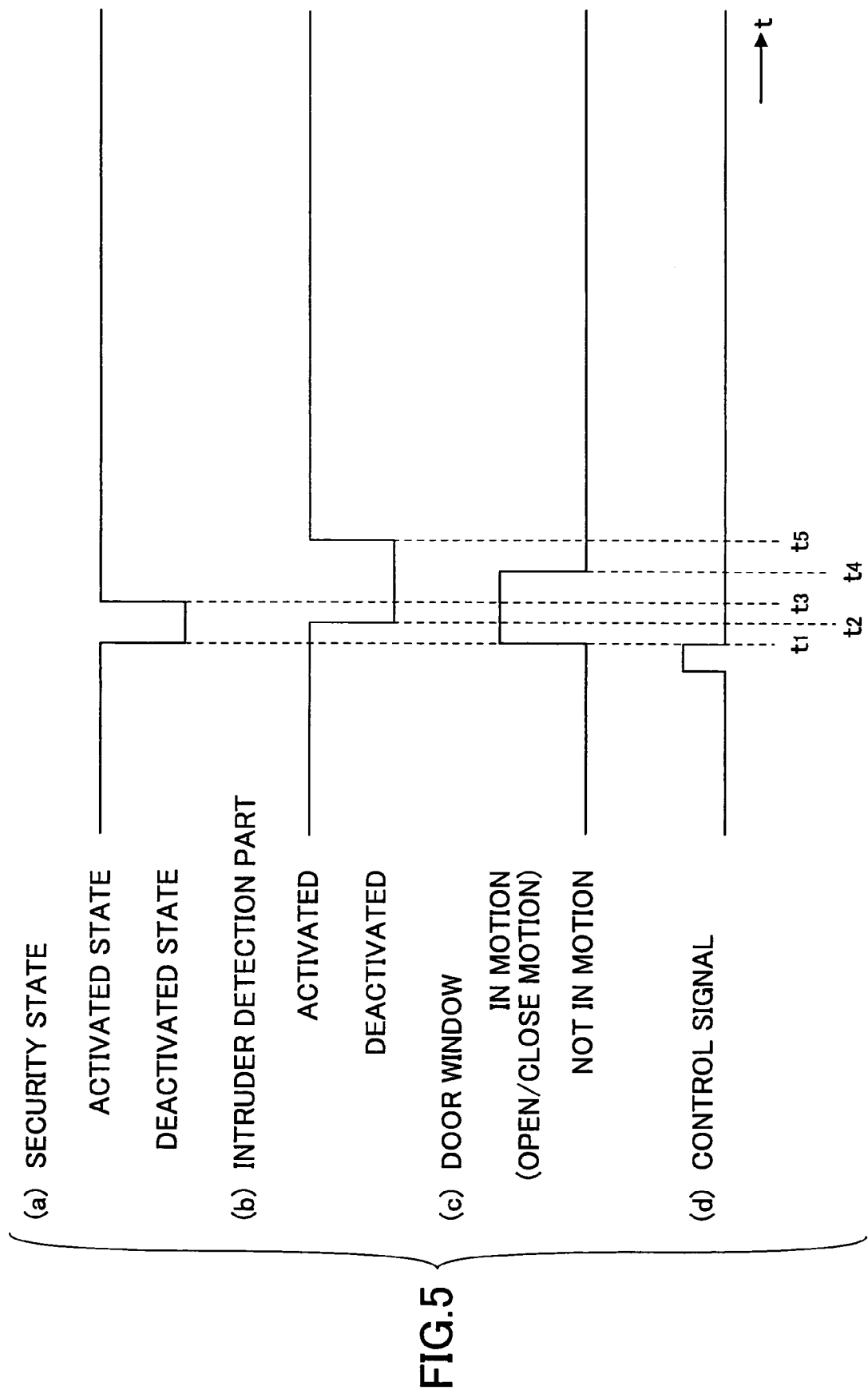
FIG. 5 is a timing chart for showing an operation of an antitheft apparatus according to the third embodiment of the present invention.

The antitheft apparatus 20 according to the third embodiment of the present invention temporarily deactivates its security state until the intruder detection part 17 is deactivated and activates its security state once the intruder detection part 17 is activated. FIG. 5 is a timing chart showing the operation of the antitheft apparatus 20 according to the third embodiment of the present invention. It is to be noted that like components are denoted with like reference numerals as of FIG. 3 and are not further described.

When the user uses (maneuvers) the terminal 4 to perform an open/close operation of the door window, the remote control device 10 receives a control signal for opening/closing the door window from the terminal 4 (timing t1). The controller 12 sends a reception signal indicating reception of the control signal of the door window to the antitheft ECU 14.

The antitheft ECU 14 sets the security state of the antitheft apparatus 20 to a deactivated state upon receiving the reception signal. Then, the controller 12 starts an opening/closing operation of the door window. Since the security state is in a deactivated state from timing t1, the alarm device 15 does not sound its alarm even when the intruder detection part 17 detects vibration caused by the opening/closing (drive) of the door window.

Then, when the antitheft ECU 14 receives a reception signal from the controller 12, the intrusion detection control part 16 deactivates the intruder detection part 17 (timing t2). Accordingly, the intruder detection part 17 does not detect vibration caused by the opening/closing (drive) of the door window after timing t2.

When the intrusion detection control part 16 deactivates the intruder detection part 17, the antitheft ECU14 sets the security state back to an activated state (timing t3). Therefore, after timing t3, the door opening/closing-switch 18, the engine ECU 19, the infrared detection device 21, and the in-vehicle camera 22 are operable to monitor the vehicle 5 and transmit detection signals to the antitheft ECU 14 owing to the fact that the security state of the antitheft apparatus 20 is in an activated state after timing t3.

When the door window reaches an upper dead point or a lower dead point, the controller 12 detects the end of the opening/closing operation of the door window from a predetermined sensor (timing t4) and sends an end signal to the antitheft apparatus 20. The intrusion detection control part 16 of the antitheft apparatus 20 activates the intruder detection part 17 when receiving the end signal from the controller 12 (timing t5).

Accordingly, the intruder detection part 17 can be prevented from erroneously detecting the vibration created by, for example, the opening/closing (driving) of the door window or erroneously detecting the wind blowing in from an opened door window. Furthermore, with the antitheft apparatus 20 according to the third embodiment of the present invention, the security state is in a deactivated state for only a short period of time (timing t1-t3). Therefore, the security level is lowered for only a short time. Thus, security can be maintained above a predetermined level.

Fourth Embodiment

Figure 6:
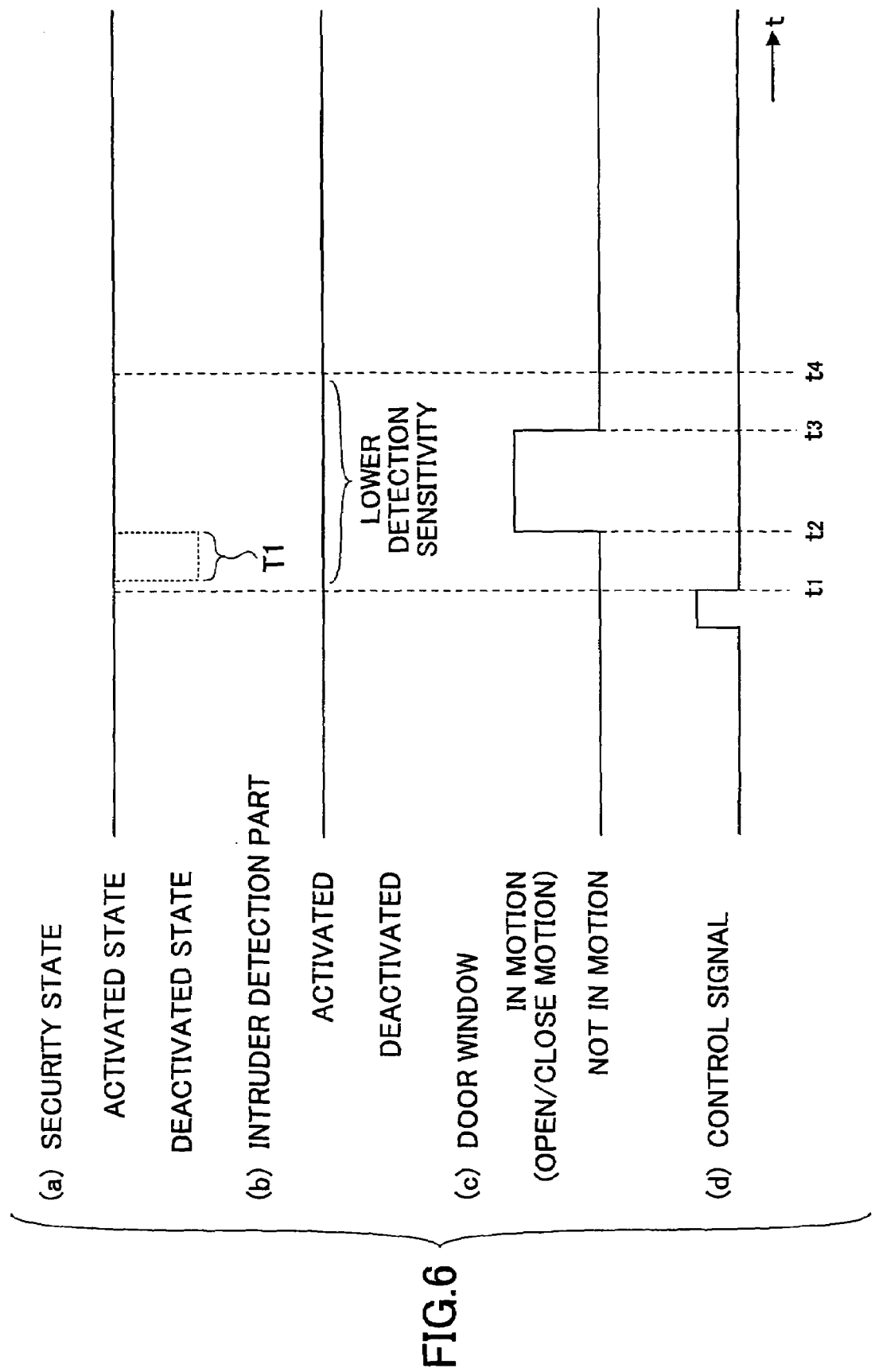
FIG. 6 is a timing chart for showing an operation of an antitheft apparatus according to the fourth embodiment of the present invention.

The antitheft apparatus 20 according to the fourth embodiment of the present invention prevents erroneous detection by lowering the detection sensitivity of the intruder detection part 17 during the period when a vehicle component 13 that creates vibration is being driven (in motion). FIG. 6 is a timing chart showing the operation of the antitheft apparatus 20 according to the fourth embodiment of the present invention. It is to be noted that like components are denoted with like reference numerals as of FIG. 3 and are not further described.

When the user uses (maneuvers) the terminal 4 to perform an open/close operation of the door window, the remote control device 10 receives a control signal for opening/closing the door window from the terminal 4 (timing t1). The controller 12 sends a reception signal indicating reception of the control signal of the door window to the antitheft ECU 14.

The intrusion detection control part 16 lowers the detection sensitivity of the intruder detection part 17 when the antitheft ECU 14 receives the reception signal. The vibration created upon opening/closing (driving) the vehicle component 13 (e.g. door window, sliding roof) is examined beforehand. Accordingly, the detection sensitivity of the intruder detection part 17 is lowered to a predetermined level (degree) in which the intruder detecting part 17 is unable to detect vibration created by opening/closing (driving) of the vehicle component 13 but is able to detect relatively large vibration caused by intrusion or robbing of the vehicle 5.

The intrusion detection control part 16 sends a low sensitivity completion signal to the controller 12 when the intrusion detection control part 16 completes the lowering of the detection sensitivity of the intruder detection part 17. The controller 12 starts an opening/closing operation of the door window in accordance with the control signal when receiving the low sensitivity completion signal from the intrusion detection control part 16 (timing t2). Accordingly, since the detection sensitivity of the intruder detection part 17 is lowered from timing t1, the intruder detection part 17 does not detect vibration caused by the opening/closing (driving) of the door window.

When the door window reaches an upper dead point or a lower dead point, the controller 12 detects the end of the opening/closing operation of the door window from a predetermined sensor (timing t3) and sends an end signal to the antitheft apparatus 20. The intrusion detection control part 16 of the antitheft ECU 14 returns the detection sensitivity of the intruder detection part 17 to its normal level when receiving the end signal from the controller 12 (timing t4).

Accordingly, the intruder detection part 17 can be prevented from erroneously detecting the vibration created by the opening/closing (driving) of the door window or erroneously detecting the wind blowing in from an opened door window. Even when the detection sensitivity of the intruder detection part 17 is lowered, security can still be maintained above a predetermined level since the intruder detection part 17 can detect relatively large vibration caused by intrusion or robbing of the vehicle 5. That is, with the antitheft apparatus according to the fourth embodiment of the present invention, a higher security level can be attained compared to a case of completely deactivating the detection function of the intruder detection part.

Furthermore, even when the detection sensitivity of the intruder detection part 17 is lowered, the door opening/closing switch 18, the engine ECU 19, the infrared detection device 21, and the in-vehicle camera 22 are operable to continue monitoring the vehicle 5 and transmit detection signals to the antitheft ECU 14. Therefore, even in such a state, the antitheft ECU 14 can sound the alarm of the alarm device 15 when a detection signal is output in response to, for example, the opening/closing of the door of the vehicle 5. Hence, erroneous sounding of the alarm can be prevented without lowering the level of security.

The same as the third embodiment of the present invention, the security state of the antitheft apparatus 20 may be set in a deactivated state during the period where the detection sensitivity is lowered (period T1).

Fifth Embodiment

Figure 7:
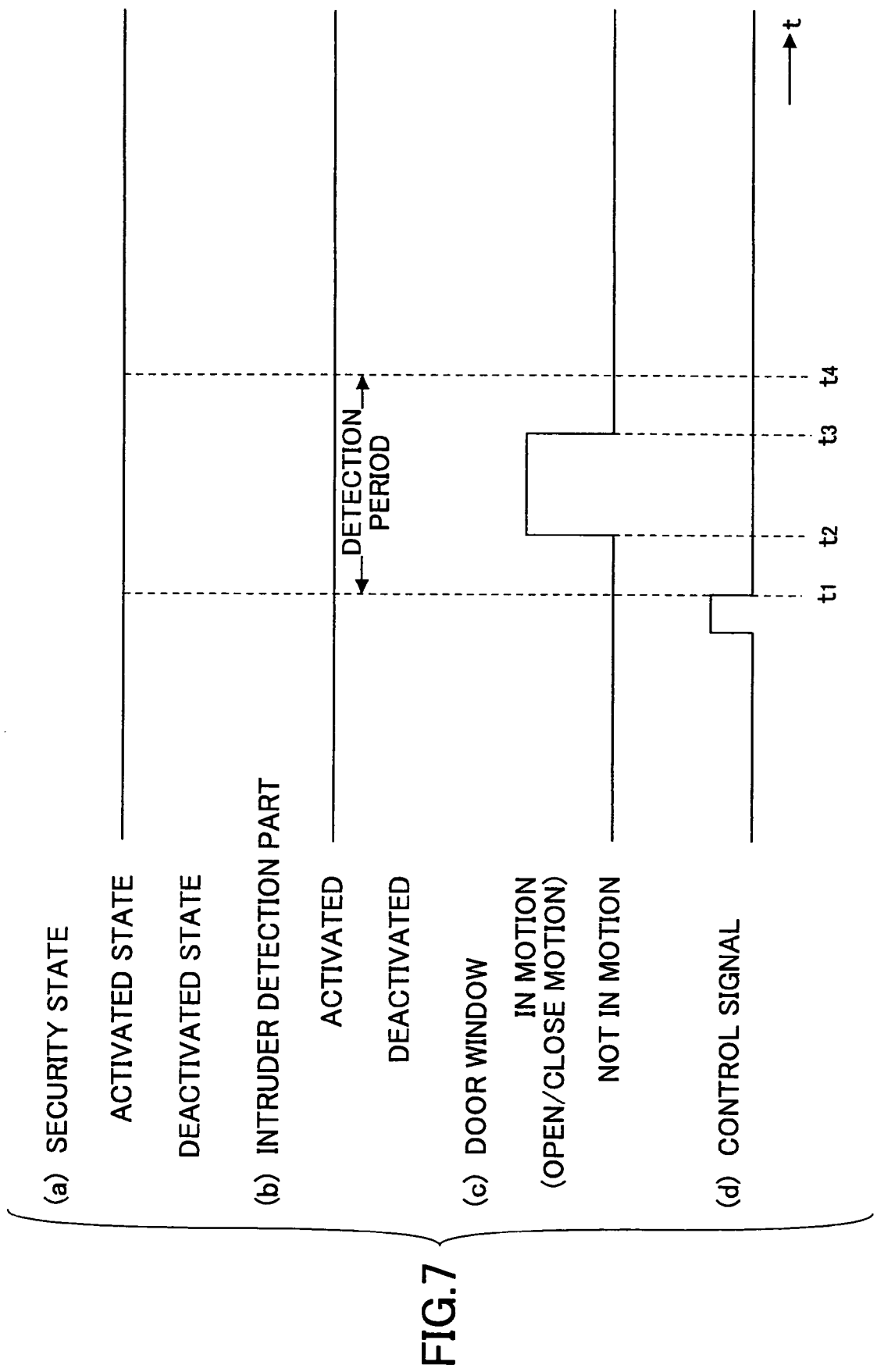
FIG. 7 is a timing chart for showing an operation of an antitheft apparatus according to the fifth embodiment of the present invention.

The antitheft apparatus 20 according to the fifth embodiment of the present invention delays the timing for sounding the alarm device 15 even when the intruder detection part 17 detects vibration during the period when a vehicle component 13 that creates vibration is being driven (in motion). FIG. 7 is a timing chart for showing the operation of the antitheft apparatus 20 according to the fifth embodiment of the present invention. It is to be noted that like components are denoted with like reference numerals as of FIG. 3 and are not further described.

When the user uses (maneuvers) the terminal 4 to perform an open/close operation of the door window, the remote control device 10 receives a control signal for opening/closing the door window from the terminal 4 (timing t1). The controller 12 sends a reception signal indicating reception of the control signal of the door window to the antitheft ECU 14.

When the antitheft ECU 14 receives the reception signal from the controller 12, the intrusion detection control part 16 extends the detection time of the intruder detection part 17 so that the time in which the intruder detection part 17 detects vibration and transmits a detection signal becomes longer than the normal detection time of the intruder detection part 17. Normally, the detection time of the intruder detection part 17 is set for a few seconds so as to promptly detect and transmit a detection signal for alerting intrusion or theft of the vehicle 5. However, in a case where the antitheft ECU 14 receives the reception signal from the controller 12, the intrusion detection control part 16 sets the detection time to a predetermined time in correspondence with the time in which a vehicle component 14 is driven, such as the time for opening or closing a door window or a sliding roof (e.g. approximately 5-10 seconds).

Therefore, even when the intruder detection part 17 detects vibration, no detection signal is transmitted until the extended detection time elapses. Therefore, the antitheft ECU 14 does not sound the alarm device 15 in response to the vibration created by the driving of the vehicle component 14.

The intrusion detection control part 16 sends an extension completion signal to the controller 12 when the intrusion detection control part 16 completes extending the detection time of the intruder detection part 17. The controller 12 starts an opening/closing operation of the door window in accordance with the control signal when receiving the extension completion signal from the intrusion detection control part 16 (timing t2). Accordingly, since the detection time is extended from timing t1, the intruder detection part 17 does not transmit a detection signal in response to the detection of vibration caused by the opening/closing (driving) of the door window.

When the door window reaches an upper dead point or a lower dead point, the controller 12 detects the end of the opening/closing operation of the door window from a predetermined sensor (timing t3) and sends an end signal to the antitheft apparatus 20. Alternatively, since it is preferable to detect intrusion immediately after the elapse of the predetermined time for the opening/closing operation of the door window, the end signal may be sent once the extended detection time elapses without having to wait for detection of the end of the opening/closing operation.

The intrusion detection control part 16 returns the detection time of the intruder detection part 17 to its normal detection time when receiving the end signal from the controller 12 (timing t4).

Figure 8:
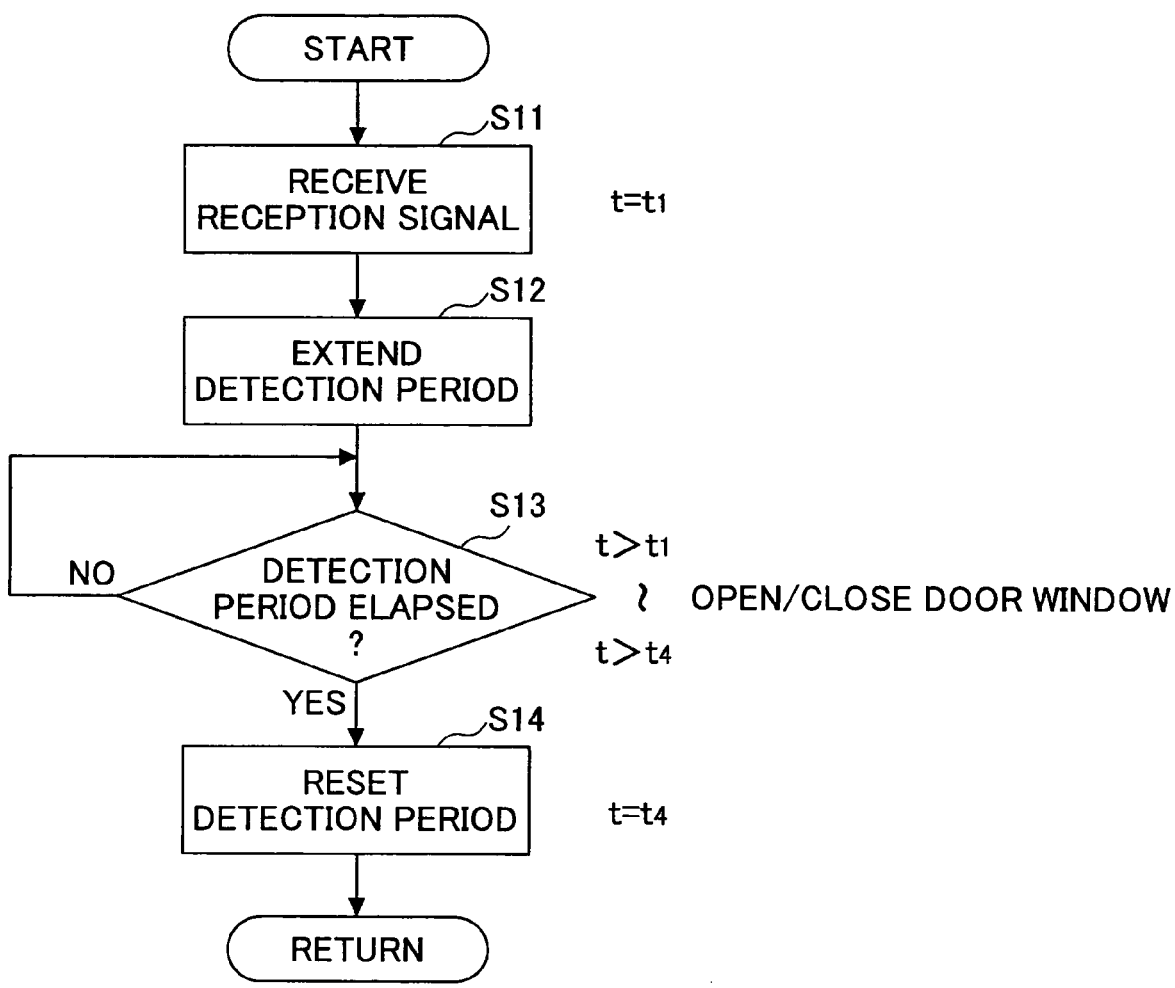
FIG. 8 is a flowchart of a process of the antitheft apparatus according to the fifth embodiment of the present invention.

FIG. 8 shows a flowchart of the process of the antitheft apparatus 20 according to the fifth embodiment of the present invention. In Step S11, the antitheft ECU 14 receives a reception signal from the controller 12. Then, in Step S12, the intrusion detection control part 16 sets (extends) the detection time of the intruder detection part 17 to a predetermined time that is longer than the normal detection time of the intruder detection part 17. It is to be noted that the timing in which the reception signal is received corresponds to timing t1 in FIG. 7.

Then, in Step S13, the antitheft ECU 14 determines whether the extended detection time has elapsed. Since the detection time corresponds to the period between timing t1 to timing t4 in FIG. 4, the controller 12 performs the opening/closing operation of the door window within this period.

Then, in Step S14, the intrusion detection control part 16 returns the extended detection time to its normal detection time after the extended detection time elapses. Thereafter, the intruder detection part 17 performs detection based on its normal detection time. Accordingly, in a case where vibration is detected after timing t4, the intruder detection part 17 can detect and transmit a detection signal in response to the vibration.

Accordingly, by extending (delaying) the detection time of the intruder detection part 17 during the period when a vehicle component 13 that creates vibration is driven (in motion), the alarm device 15 can be prevented from erroneously sounding its alarm in response to the detection of vibration created from the driving of the vehicle component 14. The antitheft apparatus 20 according to the fifth embodiment of the present invention can have a simple configuration since the detection time of the intruder detection part 17 only has to be set longer than its normal detection time. Furthermore, since the extended detection time is substantially equal to the time for driving the vehicle component 13 (e.g. opening/closing the door window), security can still be maintained above a predetermined level owing to the fact that attempts of theft taking longer than the extended detection time can still be detected.

Furthermore, since the security state of the antitheft apparatus 20 is in an activated state during the period between timing t1 and timing t4, the door opening/closing switch 18, the engine ECU 19, the infrared detection device 21, and the in-vehicle camera 22 are operable to continue monitoring the vehicle 5 and transmit detection signals to the antitheft ECU 14. Therefore, even in such a state, the antitheft ECU 14 can sound the alarm of the alarm device 15 when a detection signal is output in response to, for example, the opening/closing of the door of the vehicle 5. Hence, erroneous sounding of the alarm can be prevented without lowering the level of security. That is, with the antitheft apparatus according to the fifth embodiment of the present invention, a higher security level can be attained compared to a case of completely deactivating the detection function of the intruder detection part.

Hence, with the antitheft apparatus 20 according to the above-described embodiments of the present invention, erroneous detection of intrusion owing to vibration created by remote control of the vehicle component 13 can be prevented while maintaining security of the vehicle 5.

Further, the present invention is not limited to these embodiments, but variations and modifications may be made without departing from the scope of the present invention.

The present application is based on Japanese Priority Application No. 2005-199191 filed on Jul. 7, 2005, with the Japanese Patent Office, the entire contents of which are hereby incorporated by reference.

What is claimed is:

1. An antitheft apparatus mounted on a vehicle for protecting the vehicle from theft, said vehicle having a remote control device that controls a vehicle component of said vehicle in accordance with a control signal transmitted from a terminal, the antitheft apparatus comprising:

an intruder detection part for performing a detection function of detecting intrusion by an intruder; and an intrusion detection control part for restraining the detection function of the intruder detection part during activation of a vehicle component being controlled by the remote control device, said vehicle component including at least one of a door, a window, a sliding roof, and an air conditioner.

2. The antitheft apparatus as claimed in claim 1, further comprising:

an alarm device for sounding an alarm when intrusion is detected by the intruder detection part;

wherein the alarm device is deactivated by the intrusion detection control part during the period when the vehicle component is being controlled by the remote control device.

3. The antitheft apparatus as claimed in claim 2, wherein the intrusion detection control part is configured to deactivate the detection function of the intruder detection part.

4. The antitheft apparatus as claimed in claim 3, wherein the intrusion detection control part is configured to deactivate the alarm device before the intrusion detection control part deactivates the detection function of the intruder detection part, and is configured to activate the deactivated alarm device after the intrusion detection control part deactivates the detection function of the intruder detection part.

5. The antitheft apparatus as claimed in claim 1, wherein the intrusion detection control part is configured to lower the a detection sensitivity of the intruder detection part.

6. The antitheft apparatus as claimed in claim 1, wherein the intrusion detection control part is configured to extend a time period in which the intruder detection part detects intrusion.

7. The antitheft apparatus as claimed in claim 1, wherein the intrusion detection control part is configured to return the detection function of the intruder detection part back to a state existing before being controlled by the intrusion detection control part after the remote control device finishes controlling the vehicle component being controlled by the remote control device.

8. The antitheft apparatus as claimed in claim 1, wherein the intrusion detection part is configured to detect intrusion of an intruder by detecting vibration.

\* \* \* \* \*